United States Patent [19]

Kasai

[11] 4,009,936
[45] Mar. 1, 1977

[54] ELECTROCHROMIC DISPLAY DEVICE FREE OF LIQUID COMPONENTS

[75] Inventor: Yoshihiko Kasai, Suwa, Japan

[73] Assignee: Kabushiki Kaisha Suwa Seikosha, Tokyo, Japan

[22] Filed: Aug. 19, 1975

[21] Appl. No.: 605,954

[30] Foreign Application Priority Data

Aug. 21, 1974 Japan .................................49-95795

[52] U.S. Cl. ........................................... 350/160 R
[51] Int. Cl.² ........................................... G02B 5/23
[58] Field of Search .................. 350/160, 311, 312; 340/336

[56] References Cited

UNITED STATES PATENTS

| | | |
|---|---|---|
| 3,521,941 | 7/1970 | Deb et al. ...................... 350/160 R |
| 3,560,078 | 2/1971 | McIntyre et al. ............... 350/160 R |
| 3,704,057 | 11/1972 | Beegle ........................... 350/160 R |

*Primary Examiner*—David C. Nelms
*Attorney, Agent, or Firm*—Blum, Moscovitz, Friedman & Kaplan

[57] ABSTRACT

A display device suitable for timepieces and the like includes a solid electrochromic material and a solid electrolyte. The device is free of liquid components and is substantially thinner than conventional display devices. The problem of leakage arising from the use of liquid electrochromic material or liquid electrolyte is avoided.

13 Claims, 3 Drawing Figures

ELECTROCHROMIC DISPLAY DEVICE FREE OF LIQUID COMPONENTS

BACKGROUND OF THE INVENTION

Conventional display panels and display devices using electrochromic materials have utilized such materials as solutes in liquid electrolytes. Generally the solvent is water to which is added a metal salt to provide conductivity. Glycerine and ethylene glycol solutions have also been used, each containing an organic electrolyte as the electrochromic material and a metal salt or the like to provide adequate conductivity.

Wherever liquid materials are used in a display panel, it is necessary to use spacers and sealants in order to avoid leakage and consequent failure of the device. In general, it has been necessary to make the walls of the display device relatively thick and to make the liquid layer relatively thick both for reasons of strength and to provide the required display intensity.

Naturally, substitution of ethylene glycol or glycerol for water as the solvent increases the viscosity of the solution but, even so, leakage remains a problem, particularly where the conditions of use may be severe. Consequently, it would be extremely desirable to provide electrochromic display devices and panels which are completely free of liquid components.

SUMMARY OF THE INVENTION

Electrochromic display devices which are completely free of liquid components include solid electric transition materials, i.e., electrochromic materials in combination with solid electrolytes. For the electrochromic material, one or more of the following compounds are used: tungsten oxide, molybdenum oxide, titanium oxide, vanadium oxide, cobalt tungstate, tin oxide, tellurium oxide, iron oxide, the rare earth oxides, the metal halides, strontium titanate, the metal carbonyls, salicylidene aniline, and organic materials containing a hydrazone group, an osazone group, a semicarbazone group or a sydnone group.

Solid electrolytes are selected from the following list: $AgI$, $Ag_7I_4PO_4$ and $AgI$ in combination with a member of the group consisting of the $Ag_4P_2O_7$ series, the $Ag_2WO_4$ series, the $RbI$ series, the $NH_4I$ series, the $KCN$ series, and the $C_4H_8SCH_3I$ series, wherein each combination consists of 80 mol % of $AgI$ and 20 mol % of the series member. Of these materials $Ag_7I_4PO_4$ is preferred due to its high conductivity, the specific conductivity of this material being $2 \times 10^{-2} (ohm \cdot cm)^{-1}$. To prepare a display device or display panel in accordance with the present invention, a glass plate has formed thereon conductive electrodes which may be shaped, as, for instance, into a 7-bar digital display, and, a solid electrochromic material is deposited on said electrodes. A solid electrolyte in the form of a thin layer is then deposited over the display area, generally, over the entire display area. Where two electrodes covered with electrochromic material are in the same plane, then deposition of the solid electrolyte over the electrochromic material completes the display panel, except, if desired, for a coating thereover. The coating may be of an epoxy resin, for instance, or may be another glass plate. In another construction, a layer of conductor such as silver may be deposited over the solid electrolyte to serve as an electrode opposed to the electrochromic material electrodes. In another construction, where the electrochromic materials are essentially planar and are in essentially the same plane, a counter electrode, also essentially in the same plane may be incorporated in the structure, the purpose of said counter electrode being for the redox reaction. In all of the constructions, it is preferable to cover the open face of the electrolyte or of the electrode over the electrolyte with a resin or a glass plate.

Accordingly, an object of the present invention is an electrochromic display device which is completely free of liquid components.

Another object of the present invention is an electrochromic display device or panel utilizing a solid electrochromic material and one or more solid electrolytes.

A further object of the present invention is an electrochromic display device or panel of unusually small thickness, the reduction in thickness over the conventional display device being achieved through the use of a solid electrolyte.

An important object of the present invention is an electrochromic display device or panel wherein the thickness of the solid electrolyte therein is of the order of 2 microns.

A significant object of the present invention is an electrochromic display device which is completely free of the danger of loss of liquid under either normal or severe operating conditions.

Yet another object of the present invention is a method of forming an electrochromic display device which is free of liquid components.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
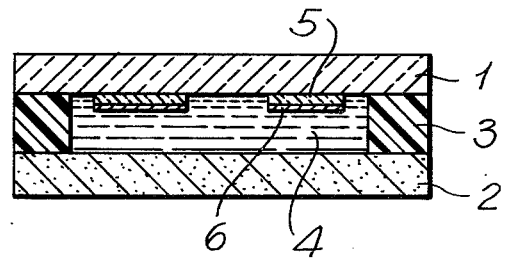
FIG. 1 is a view in section of an electrochromic display device in accordance with the prior art.

An electrochromic display device in accordance with the prior art is shown in FIG. 1 in which opposed glass plate 1 and metal plate 2 in combination with sealing spacer 3 constitute a cell filled with an electrolyte 4. Transparent electrodes 5 are positioned on the inner face of glass plate 1 and each electrode 5 is covered with a layer of electrochromic material, i.e., electric transition layer 6. Transparent electrode 5 is of the usual conductive glass such as the well-known Nesa glass, or indium oxide. Usually, the transparent conductive glass 5 is shaped or patterned so that indicia, and, in particular, numerics may be selectively displayed. The electrodes 5 are selectively connectable to an external source of voltage in the usual manner. The electrochromic material 6 may be secured to transparent electrodes 5 by deposition or adhesion, the electrochromic material being either inorganic or organic. Electrode 2 may be either of metal, as shown, or may be a sheet of glass covered with a transparent conductive electrode. A third electrode, not shown, may also be positioned in the system as an auxiliary electrode to function as a counter electrode to cause a redox reaction of the electrochromic material in the same plane. Such devices are shown in Japanese Patent Publications Nos. 898/74 and 1594/74.

The conventional electrolyte 4 consists of a water solution of a metal salt or an organic electrolyte such as glycerine or ethylene glycol to which is added acid and a metal salt to provide conductivity. Although such materials vary in viscosity, all of them are liquid, as a result of which the possibility of leakage from the cell is always present. Moreover, in order to provide the necessary strength and encapsulation against leakage, the thickness of the device is necessarily substantial. The twin problems of leakage and excessive thickness are substantial disadvantages in many applications, particularly where the device is used under severe operating conditions as in a wristwatch.

Figure 2:
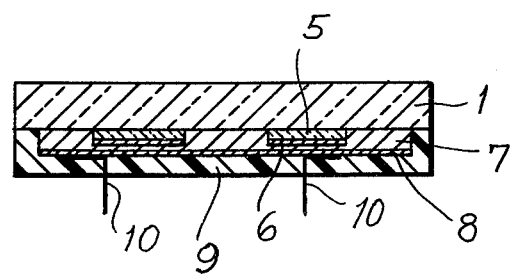
FIG. 2 is a view in section of an embodiment of a display device in accordance with the present invention.

FIG. 2 shows an embodiment constructed in accordance with the present invention. A main surface of plate 1, which preferably is of glass, is coated with patterned conductive film 5. The pattern may consist of the standard 7-bar numeric or a plurality of such 7-bar arrays or other types of indicia. Tungsten oxide is deposited in a layer 6 on the shaped electrodes 5. The method of forming the layer 6 is preferably by means of vacuum deposition. The thickness of the layer should be less than about 1 $\mu$.

The weight of plate 1 with the deposits thereon is determined and silver is then deposited in a layer over the entire display area. A suitable thickness is about 2 $\mu$ and the plate is reweighed in order to determine the weight of silver deposited. The silver can be deposited by vacuum evaporation or by chemical reduction. The base plate 1 is placed in a chamber into which is introduced nitrogen containing iodine vapor produced by subliming solid iodine. The quantity sublimed is carefully controlled so that the entire mass of Ag may be converted to AgI. For the conversion, the plate is raised to about 160° C for about 200 minutes in an electric furnace. The product is light yellow in color and is represented in FIG. 2 by the reference numeral 7. A thin layer of silver, 8, preferably about 0.5 $\mu$ thick is then deposited over the AgI. Finally, leads 10 are positioned in contact with the silver layer 8 and the solid electrolyte and the silver layer are completely encased in a resin 9 which may be an epoxy. The forming of the resin is preferably carried out in a die.

A DC voltage of about 1.5 is applied between electrode 5 by a lead (not shown) and lead 10. Electrode 1 is made negative, thereby producing a dark blue color. When the electrode 1 is made positive, the light yellow color of the solid electrolyte, AgI becomes evident. The whole panel shows the same color.

The resultant display device is about half the thickness of a conventional display device and has a life in excess of about $10^5$ activations. As is evident, the construction is simple and the device is completely free of any liquid components.

In the embodiment described AgI is used as the solid electrolyte but many other types of electrolytes are also suitable for use in the device of the present invention. A compound having the composition $Ag_7I_4PO_4$ is formed by encapsulating 80 mol % of AgI and 20 mol % of $Ag_3PO_4$ in an evacuated tube of a glass such as a borosilicate glass, and heating it for 20 hours at 400° C. The specific conductivity of the silver ion in this compound is $2 \times 10^{-2}(ohm \cdot cm)^{-1}$, the conductivity of this compound being the highest of the silver iodine-silver phosphate series. Moreover, the speed of response to this compound is substantially greater than that of simple AgI. Compositions depending on the conductivity of silver iodine are the AgI - $Ag_4P_2O_7$ series, the AgI - $Ag_2WO_4$ series, the AgI - RbI series, the AgI - $NH_4I$ series, AgI - KCN series and the AgI - $C_4H_8SCH_3I$ series. In general, the optimum ratios for the two components of each composition are 80 mol % of the AgI component and 20 mol % of the other component. The copper halide compounds are also suitable as solid electrolytes.

In general, ion-conduction arises from lattice defects. In this respect, these compounds closely resemble the well-known semiconductors which are doped to produce lattice defects. Furthermore, it is possible to use compositions which depend both on ion conduction and conduction by electrons and holes.

Although tungsten oxide was given as an example of a solid electrochromic material, there are many other compounds and compositions which can be used for this purpose and in combination with a solid electrolyte. Thus, the following compounds can be used either alone or in suitable combinations: tungsten oxide, molybdenum oxide, titanium oxide, vanadium oxide, cobalt tungstate, tin oxide, tellurium oxide, iron oxide, the rare earth oxides, metal halides, strontium titanate, metal carbonyls. Among the organic electrochromic materials are the compounds containing anil groups, hydrazone groups, osazone groups, semicarbazone groups, and sydnone groups. Another compound which has been found useful is salicylidene aniline.

Figure 3:
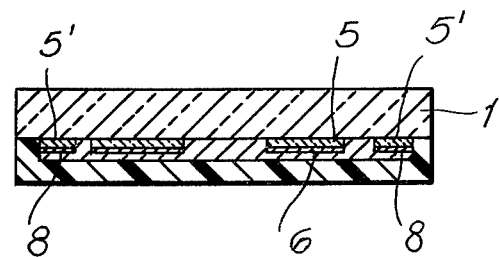
FIG. 3 is a view in section of a second embodiment of a display device in accordance with the present invention.

A second embodiment of the invention is shown in FIG. 3 in which counter electrodes which are essentially in the same plane as the patterned electrodes are shown. Once more, a face plate 1 has patterned electrodes 5 thereon covered with an electrochromic material 6. Further transparent electrodes 5' are provided, these being covered with a layer 8 of a conductive material such as silver.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A display device free of liquid components, comprising a solid electrochromic material, a solid electrolyte having electrical conductivity based at least in part on ionic conduction and making contact with said electrochromic material and electrodes making contact with said electrolyte and with said electrochromic material for activating said electrochromic material.

2. The display device as defined in claim 1 wherein said electrochromic material is selected from the group consisting of tungsten oxide, molybdenum oxide, titanium oxide, vanadium oxide, cobalt tungstate, tin oxide, tellurium oxide, iron oxide, rare earth oxides, metal halides, strontium titanate, metal carbonyl, salicylidene aniline, and organic compounds containing at least one group selected from the following group of groups, anil, hydrazone, osazone, semicarbazone and sydnone.

3. The display device as defined in claim 1, wherein said solid electrolyte is a composition consisting of AgI in combination with a member of the group consisting of the $Ag_4P_2O_7$ series, the $Ag_2WO_4$ series, the RbI series, the $NH_4I$ series, the KCN series, the $C_4H_8SCH_3I$ series and the copper halides.

4. The display device as defined in claim 3, wherein said composition consists of 80 mol % of AgI and 20 mol % of a member of said group.

5. The display device as defined in claim 1, wherein said solid electrolyte is $Ag_7I_4PO_4$.

6. The display device as defined in claim 1, wherein the number of electrodes is two.

7. The display device as defined in claim 6, wherein said electrodes are essentially planar and are in essentially the same plane.

8. The display device as defined in claim 7, further comprising a counter electrode for carrying out the redox reaction of the electrochromic electrolyte.

9. The display device as defined in claim 1, wherein said electrochromic material is tungsten oxide.

10. A method of forming a solid electrolyte in a display device including a transparent plate, transparent, shaped conductive electrodes on the surface thereof and a film less than about 1 $\mu$ thick of tungsten oxide on said electrodes, comprising the steps of depositing a layer of silver over the display area of said display device and bringing said silver layer thereon into contact with sufficient $I_2$ under conditions such as to convert said Ag to AgI.

11. The method as defined in claim 10, wherein said conditions are heat treatment at approximately 160° C for approximately 200 minutes in an atmosphere of nitrogen containing iodine.

12. The method as defined in claim 11, wherein the thickness of said metal deposit is approximately 2 $\mu$.

13. The method as defined in claim 11, further comprising the step of depositing a layer of silver over said AgI.

* * * * *